United States Patent
Wang et al.

(10) Patent No.: US 11,047,751 B2
(45) Date of Patent: Jun. 29, 2021

(54) METHOD FOR CHECKING THE DESIGN OF LOCKING ASSEMBLIES

(71) Applicant: Taiyuan University of Science and Technology, Shanxi (CN)

(72) Inventors: Jianmei Wang, Shanxi (CN); Ke Ning, Shanxi (CN); Dingbang Hou, Shanxi (CN)

(73) Assignee: Taiyuan University of Science and Technology, Taiyuan (CN)

( * ) Notice: Subject to any disclaimer, the term of this patent is extended or adjusted under 35 U.S.C. 154(b) by 131 days.

(21) Appl. No.: 16/510,825

(22) Filed: Jul. 12, 2019

(65) Prior Publication Data

US 2020/0249108 A1  Aug. 6, 2020

(30) Foreign Application Priority Data

Jan. 31, 2019 (CN) .......................... 201910098828.8

(51) Int. Cl.
*G01L 5/00* (2006.01)
*F16D 1/09* (2006.01)

(52) U.S. Cl.
CPC .............. *G01L 5/0042* (2013.01); *F16D 1/09* (2013.01)

(58) Field of Classification Search
CPC ................................ G01L 5/0042; F16D 1/09
See application file for complete search history.

(56) References Cited

U.S. PATENT DOCUMENTS

| | | | | |
|---|---|---|---|---|
| 4,140,413 A * | 2/1979 | Conrad | ..................... | F16D 1/09 279/16 |
| 5,123,772 A * | 6/1992 | Anderson | ................. | F16D 1/09 403/374.4 |
| 5,692,863 A * | 12/1997 | Louw | .................... | F16B 39/284 411/3 |
| 5,775,831 A * | 7/1998 | Mullenberg | .............. | F16B 2/14 403/337 |
| 6,122,099 A * | 9/2000 | Connors | ................ | G02B 23/12 359/350 |
| 8,104,476 B2 * | 1/2012 | Neame | .............. | A61M 16/0488 128/207.17 |
| 2002/0129866 A1 * | 9/2002 | Czebatul | ............... | B65B 13/027 140/123.6 |

(Continued)

FOREIGN PATENT DOCUMENTS

| CN | 101210485 B | 6/2012 |
|---|---|---|
| CN | 204985385 U | 1/2016 |
| CN | 205342108 U | 6/2016 |

*Primary Examiner* — Max H Noori

(57) ABSTRACT

A method for checking the design of locking assemblies is provided. A pressure on each contact surface and a torque that can be transferred by a spindle and a bushing after locking assemblies are locked are calculated. The calculated torque is compared with the designed maximum transferable torque to calculate a torque safety coefficient. Based on a minimum fit clearance, a resultant stress of components is calculated and is compared with a yield strength of the material of the components to calculate a strength safety coefficient of the components. A pre-tightening force of the bolts is obtained according to a given pre-tightening moment of the bolts. A maximum equivalent stress of the bolts is calculated to obtain a safety coefficient of the bolts. This method is able to be applied to the manufacturing of the locking assemblies.

2 Claims, 1 Drawing Sheet

(56) References Cited

U.S. PATENT DOCUMENTS

| | | | |
|---|---|---|---|
| 2003/0035699 A1* | 2/2003 | Harris | F16B 39/282 411/161 |
| 2003/0060823 A1* | 3/2003 | Bryan | A61B 17/7011 606/86 A |
| 2005/0205388 A1* | 9/2005 | Whipple | B65G 39/02 193/37 |
| 2006/0185269 A1* | 8/2006 | Kufner | E04F 21/22 52/169.1 |
| 2017/0043746 A1* | 2/2017 | Caverly | B60R 25/023 |

* cited by examiner

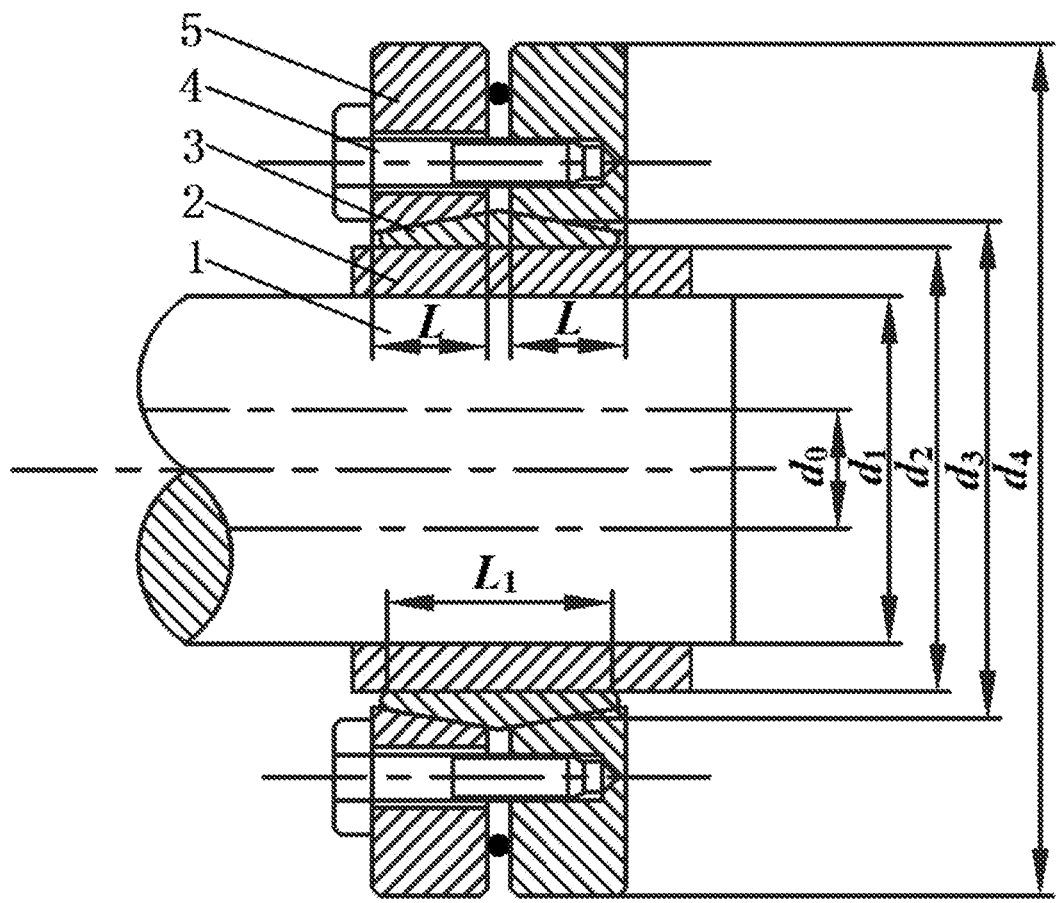

ns/CN201910098828.8, filed on
METHOD FOR CHECKING THE DESIGN OF LOCKING ASSEMBLIES

CROSS-REFERENCE TO RELATED APPLICATIONS

This application claims the benefit of priority from Chinese Patent Application No. CN201910098828.8, filed on Jan. 31, 2019. The content of the aforementioned application, including any intervening amendments thereto, is incorporated herein by reference in its entirety.

TECHNICAL FIELD

The present invention relates to a method for checking the design of locking assemblies, belonging to the technical field of mechanical transmission.

BACKGROUND OF THE PRESENT INVENTION

As a basic connector for connecting drive parts in a mechanical drive system, locking assemblies function to bear loads, transfer torque and provide overload protection for other drive parts. According to their shape, the locking assemblies include single-cone locking assemblies and double-cone locking assemblies. Traditionally, the check is carried out only by finite element simulation and experimental testing, both of which are time-consuming and material-wasting. In the present invention, a novel check method is provided by theoretical research, with the consideration of the bearing capacity, the strength of the structure and the strength of the bolts, and in combination with the bending moment and the torque.

SUMMARY OF THE PRESENT INVENTION

An objective of the present invention is to provide a novel check method that has advantages of simple operation and high applicability, provides stable and reliable result, can improvethe design and manufacture efficiency, in order to solve the technical problems that the existing methods for checking the design of locking assemblies are time-consuming, material-wasting and lack of comprehensive check factors.

For this purpose, the present invention employs the following technical solutions.

1) calculating an axial force generated by bolts:

calculating, according to the number n of selected bolts and a pre-tightening moment $M_0$, an axial force generated by bolts:

$$F_a = \frac{M_0 n}{kd} \quad (1)$$

where, $F_a$ is an axial force generated by the bolts, d is a diameter of the bolts, $M_0$ is a pre-tightening moment of the bolts, and k is a moment coefficient, the value of which is 0.11 to 0.15;

determining, according to a size of the locking assemblies and by force analysis, a contact pressure $p_3$ between the inner ring and the outer ring:

$$p_3 = \frac{F_a(1 - \mu_1 \tan\beta)}{L\pi d_3(\tan\beta + \mu_1)} \quad (2)$$

where, L is a length of the outer ring, $d_3$ is a mean diameter of a conical surface of the inner ring coming into contact with the outer ring, $\mu_1$ is a friction coefficient between the inner ring and the outer ring, the value of which can be found in the Machinery's Handbook, and $\beta$ is an angle of inclination of the conical surface of the inner ring;

2) when the spindle and the bushing as well as the bushing and the inner ring are in a maximum fit clearance, calculating a minimum contact pressure $p_{1a}$ between the spindle and the bushing and also a minimum contact pressure $p_{2a}$ between the bushing and the inner ring:

$$\begin{cases} (A - B)p_{1a} + Cp_{2a} = \Delta_{1max} \\ Dp_{1a} - (F + G)p_{2a} + Hp_3 = \Delta_{2max} \end{cases} \quad (3)$$

where, $\Delta_{1max}$ and $\Delta_{2max}$ are maximum fit clearances between the spindle and the bushing as well as between the bushing and the inner ring, $$A = -\frac{[1 + v_1 + (1 - v_1)(n_1)^2] \cdot d_1}{E_1[(n_1)^2 - 1]},$$

$$B = \frac{[1 - v_2 + (1 + v_2)(n_2)^2] \cdot d_1}{E_2[(n_2)^2 - 1]},$$

$$C = \frac{2d_1(n_2)^2}{E_2[(n_2)^2 - 1]},$$

$$D = \frac{2d_2}{E_2[(n_2)^2 - 1]},$$

$$F = \frac{[1 + v_2 + (1 - v_2)(n_2)^2] \cdot d_2}{E_2[(n_2)^2 - 1]},$$

$$G = \frac{[1 - v_3 + (1 + v_3)(n_3)^2] \cdot d_2}{E_3[(n_3)^2 - 1]},$$

$$H = \frac{2d_2(n_3)^2}{E_3[(n_3)^2 - 1]},$$

$$n_1 = \frac{d_1}{d_0},$$

$$n_2 = \frac{d_2}{d_1},$$

$$n_3 = \frac{d_3}{d_2},$$

$d_0$ is an inner diameter of the spindle, $d_1$ is an outer diameter of the spindle, $d_2$ is an outer diameter of the bushing, $E_1$, $E_2$, $E_3$ are respectively elasticity moduli of the spindle, the bushing and the inner ring, $v_1$, $v_2$, $v_3$ are respectively Poisson's ratios of the spindle, the bushing and the inner ring;

calculating a transferred torque $M_t$ by the minimum contact pressure $p_{1a}$ between the spindle and the bushing:

$$M_t = \frac{p_{1a}\pi d_1^2 L_1 \mu}{2} \quad (4)$$

where, $L_1$ is a contact length between the bushing and the inner ring, and $\mu$ is a friction coefficient between the spindle and the bushing, the value of which can be found in the Machinery's Handbook;

3) calculating, according to a maximum torque $M_{max}$ and a maximum bending torque $M_b$ required in the design of the locking assemblies, an equivalent torque:

$$M_{tT} = \sqrt{M_{max}^2 + (KM_b)^2} \qquad (5)$$

where, K is a conversion coefficient for the bending moment and the torque, the value of which is 0.3 to 0.6;

comparing the equivalent torque with the torque $M_t$ obtained in the equation (4) to calculate a torque safety coefficient:

$$S_0 = \frac{M_t}{M_{tT}} \qquad (6)$$

4) calculating an edge stress according to the maximum bending moment $M_b$ and a maximum radial force $F_r$:

$$q = \frac{F_r}{S} + \frac{M_b}{W_z} \qquad (7)$$

where, S is a cross-sectional area of the spindle, and $W_z$ is a section modulus in bending, the value of which can be found in the Machinery's Handbook; the obtained edge stress q is compared with $p_{1a}$ obtained in the equation (3), and it is considered as conforming to the design requirements if $q < p_{1a}$;

5) when the spindle and the bushing as well as the bushing and the inner ring are in a minimum fit clearance, by using $\Delta_{1min}$ and $\Delta_{2min}$ as minimum fit clearances between the spindle and the bushing as well as between the bushing and the inner ring, calculating a maximum contact pressure $p_{1b}$ between the spindle and the bushing and also a maximum contact pressure $p_{2b}$ between the bushing and the inner ring by the equations (2) and (3), and checking the strength of the spindle, the bushing, the inner ring and the outer ring;

6) calculating a pre-tightening force of a single bolt according to the given pre-tightening moment of the bolts:

$$F_{a1} = \frac{M_0}{kd} \qquad (16)$$

where, $F_{a1}$ is the pre-tightening force of a single bolt;

checking the strength of the bolts and calculating a maximum equivalent stress:

$$\sigma = \frac{5.2 F_{a1}}{\pi d^2} \qquad (17)$$

calculating a safety coefficient of the bolts:

$$S_5 = \frac{[\sigma]}{\sigma} \qquad (18)$$

where, $[\sigma]$ is an allowable stress of the bolts, which can be obtained by searching from the Machinery's Handbook according to the level of performance of the bolts.

The present invention has the following beneficial effects.

In the present invention, a torque that can be transferred after the locking assemblies are locked is calculated according to the number of selected bolts and a pre-tightening moment of the bolts, and the calculated torque is compared with the designed maximum torque to calculate a torque safety coefficient; then, a resultant stress of components is calculated, and the resultant stress is compared with a yield strength of the material of the components to calculate a strength safety coefficient; and finally, a pre-tightening force is obtained according to a given pre-tightening moment of the bolts, a maximum equivalent stress is calculated, and a safety coefficient of the bolts is obtained. By this method, it can be verified whether a maximum torque can be transferred after the locking assemblies is locked, whether a maximum bending moment is borne, and whether the material of components undergoes plastic failure. This method in the present invention has advantages of simple operation and high applicability, and can effectively verify the rationality of design of locking assemblies, reduce the manufacture risk and increase the yield of products. Compared with the prior art, the present invention provides for stable and reliable check result and improves the design and manufacture efficiency.

BRIEF DESCRIPTION OF THE DRAWINGS

FIG. 1 is a structural diagram of the locking assemblies according to the present invention, in which:
1: spindle;
2: bushing;
3: inner ring;
4: bolt;
5: outer ring;
$d_0$: the inner diameter of the spindle;
$d_1$ is the outer diameter of the spindle;
$d_2$ is the outer diameter of the bushing;
$d_3$ is the mean diameter of a conical surface of the inner ring coming into contact with the outer ring;
$d_4$ is the outer diameter of the outer ring;
L is the length of the outer ring;
$L_1$ is the contact length between the bushing and the inner ring.

DETAILED DESCRIPTION OF THE PRESENT INVENTION

The present invention will be further described below with reference to the accompanying drawings and by embodiments.

As shown in FIG. 1, the locking assemblies consist of an inner ring, an outer ring and bolts. The locking assembliesaresheathed on the bushing and the spindle. The check method comprises steps of:

1) calculating an axial force generated by bolts:

calculating, according to the number n of selected bolts and a pre-tightening moment $M_0$, an axial force generated by bolts:

$$F_a = \frac{M_0 n}{kd} \qquad (1)$$

where, $F_a$ is an axial force generated by the bolts, d is a diameter of the bolts, $M_0$ is a pre-tightening moment of the bolts, and k is a moment coefficient, the value of which is 0.11 to 0.15;

determining, according to a size of the locking assemblies and by force analysis, a contact pressure $p_3$ between the inner ring and the outer ring:

$$p_3 = \frac{F_a(1 - \mu_1 \tan\beta)}{L\pi d_3(\tan\beta + \mu_1)} \qquad (2)$$

where, L is a length of the outer ring, $d_3$ is a mean diameter of a conical surface of the inner ring coming into contact with the outer ring, $\mu_1$ is a friction coefficient between the inner ring and the outer ring, the value of which can be found in the Machinery's Handbook, and $\beta$ is an angle of inclination of the conical surface of the inner ring;

2) When the spindle and the bushing as well as the bushing and the inner ring are in a maximum fit clearance, calculating a minimum contact pressure $p_{1a}$ between the spindle and the bushing and also a minimum contact pressure $p_{2a}$ between the bushing and the inner ring:

$$\begin{cases} (A - B)p_{1a} + Cp_{2a} = \Delta_{1max} \\ Dp_{1a} - (F + G)p_{2a} + Hp_3 = \Delta_{2max} \end{cases} \qquad (3)$$

where, $\Delta_{1max}$ and $\Delta_{2max}$ are maximum fit clearances between the spindle and the bushing as well as between the bushing and the inner ring, $$A = -\frac{[1 + v_1 + (1 - v_1)(n_1)^2] \cdot d_1}{E_1[(n_1)^2 - 1]},$$

$$B = \frac{[1 - v_2 + (1 + v_2)(n_2)^2] \cdot d_1}{E_2[(n_2)^2 - 1]},$$

$$C = \frac{2d_1(n_2)^2}{E_2[(n_2)^2 - 1]},$$

$$D = \frac{2d_2}{E_2[(n_2)^2 - 1]},$$

$$F = \frac{[1 + v_2 + (1 - v_2)(n_2)^2] \cdot d_2}{E_2[(n_2)^2 - 1]},$$

$$G = \frac{[1 - v_3 + (1 + v_3)(n_3)^2] \cdot d_2}{E_3[(n_3)^2 - 1]},$$

$$H = \frac{2d_2(n_3)^2}{E_3[(n_3)^2 - 1]},$$

$$n_1 = \frac{d_1}{d_0},$$

$$n_2 = \frac{d_2}{d_1},$$

$$n_3 = \frac{d_3}{d_2},$$

$d_0$ is an inner diameter of the spindle, $d_1$ is an outer diameter of the spindle, $d_2$ is an outer diameter of the bushing, $E_1$, $E_2$, $E_3$ are respectively elasticity moduli of the spindle, the bushing and the inner ring, $v_1$, $v_2$, $v_3$ are respectively Poisson's ratios of the spindle, the bushing and the inner ring;

calculating a transferred torque $M_t$ by the minimum contact pressure $p_{1a}$ between the spindle and the bushing:

$$M_t = \frac{p_{1a}\pi d_1^2 L_1 \mu}{2} \qquad (4)$$

where, $L_1$ is a contact length between the bushing and the inner ring, and $\mu$ is a friction coefficient between the spindle and the bushing, the value of which can be found in the Machinery's Handbook;

3) calculating, according to a maximum torque $M_{max}$ and a maximum bending torque $M_b$ required in the design of the locking assemblies, an equivalent torque:

$$M_{tT} = \sqrt{M_{max}^2 + (KM_b)^2} \qquad (5)$$

where, K is a conversion coefficient for the bending moment and the torque, the value of which is 0.3 to 0.6;

comparing the equivalent torque with the torque $M_t$ obtained in the equation (4) to calculate a torque safety coefficient:

$$S_0 = \frac{M_t}{M_{tT}} \qquad (6)$$

4) calculating an edge stress according to the maximum bending moment $M_b$ and a maximum radial force $F_r$:

$$q = \frac{F_r}{S} + \frac{M_b}{W_z} \qquad (7)$$

where, S is a cross-sectional area of the spindle, and $W_z$ is a section modulus in bending, the value of which can be found in the Machinery's Handbook; the obtained edge stress q is compared with $p_{1a}$ obtained in the equation (3), and it is considered as conforming to the design requirements if $q<p_{1a}$;

5) when the spindle and the bushing as well as the bushing and the inner ring are in a minimum fit clearance, by using $\Delta_{1min}$ and $\Delta_{2min}$ as minimum fit clearances between the spindle and the bushing as well as between the bushing and the inner ring, calculating a maximum contact pressure $p_{1b}$ between the spindle and the bushing and also a maximum contact pressure $p_{2b}$ between the bushing and the inner ring by the equations (2) and (3), and checking the strength of the spindle, the bushing, the inner ring and the outer ring;

① checking the strength of the spindle: at an external pressure of $p_{1b}$ and an internal pressure of 0, calculating a maximum normal stress $\sigma_1$, a shear stress $\tau_1$ and a bending stress $\sigma_{1b}$ of the spindle, and calculating a maximum equivalent stress:

$$\sigma_{1s} = \sqrt{\sigma_1^2 + 3\tau_1^2} \pm \sigma_{1b} \qquad (8)$$

comparing the maximum equivalent stress with a yield strength $\sigma_{1a}$ of the material of the spindle, and calculating a safety coefficient of the spindle:

$$S_1 = \sigma_{1a}/\sigma_{1s} \qquad (9)$$

② checking the strength of the bushing: at an external pressure of $p_{2b}$ and an internal pressure of 0, calculating a radial normal stress $\sigma_{2p}$, a circumferential normal stress $\sigma_{2\varphi}$, a shear stress $\tau_2$ and a bending stress $\sigma_{2b}$ of the bushing, and calculating a maximum equivalent stress:

$$\sigma_{2s} = \sqrt{\sigma_{2p}^2 + \sigma_{2\varphi}^2 - \sigma_{2p}\sigma_{2\varphi} 3\tau_2^2} \pm \sigma_{2b} \qquad (10)$$

comparing the maximum equivalent stress with a yield strength $\sigma_{2a}$ of the material of the bushing, and calculating a safety coefficient of the bushing:

$$S_2 = \sigma_{2a}/\sigma_{2s} \quad (11)$$

③ checking the strength of the inner ring: at an external pressure of $p_3$ and an internal pressure of $p_{2b}$, calculating a radial normal stress $\sigma_{3p}$ and a circumferential normal stress $\sigma_{3\varphi}$ of the inner ring, and calculating a maximum equivalent stress:

$$\sigma_{3s} = \sqrt{\sigma_{3p}^2 + \sigma_{3\varphi}^2 - \sigma_{3p}\sigma_{3\varphi}} \quad (12)$$

comparing the maximum equivalent stress with a yield strength $\sigma_{3a}$ of the material of the inner ring, and calculating a safety coefficient of the inner ring:

$$S_3 = \sigma_{3a}/\sigma_{3s} \quad (13)$$

④ checking the strength of the outer ring: at an external pressure of 0 and an internal pressure of $p_3$, calculating a radial normal stress $\sigma_{4p}$ and a circumferential normal stress $\sigma_{4\varphi}$ of the outer ring, and calculating a maximum equivalent stress:

$$\sigma_{4s} = \sqrt{\sigma_{4p}^2 + \sigma_{4\varphi}^2 - \sigma_{4p}\sigma_{4\varphi}} \quad (14)$$

comparing the maximum equivalent stress with a yield strength $\sigma_{4a}$ of the material of the outer ring, and calculating a safety coefficient of the outer ring:

$$S_4 = \sigma_{4a}/\sigma_{4s} \quad (15)$$

6) calculating a pre-tightening force of a single bolt according to the given pre-tightening moment of the bolts:

$$F_{a1} = \frac{M_0}{kd} \quad (16)$$

where, $F_{a1}$ is the pre-tightening force of a single bolt;
checking the strength of the bolts and calculating a maximum equivalent stress:

$$\sigma = \frac{5.2 F_{a1}}{\pi d^2} \quad (17)$$

calculating a safety coefficient of the bolts:

$$S_5 = \frac{[\sigma]}{\sigma} \quad (18)$$

where, $[\sigma]$ is an allowable stress of the bolts, which can be obtained by searching from the Machinery's Handbook according to the level of performance of the bolts. It is considered that it conforms to the design and check requirements if the safety coefficients $S_0$-$S_5$ are greater than 1.

The present invention will be further described by a specific application instance.

In this instance, the locking assemblies with the following specific parameters is used: an inner diameter of the spindle of 30 mm, an outer diameter of the spindle of 245 mm, an outer diameter of the bushing of 300 mm, and an outer diameter of the outer ring of 485 mm. The maximum fit clearances of the spindle and bushing, bushing and inner ring are 0.09 mm and 0.14 mm respectively. The minimum fit clearances of the spindle and bushing, bushing and inner ring are 0.015 mm and 0.056 mm respectively. The elasticity modulus of the bushing is 176 Gpa, and the elasticity modulus of each of the spindle, the inner ring and the outer ring is 206 GPa. The Poisson's ratio of all the components is 0.3. The length of the outer ring is 77 mm. The contact length between the bushing and the inner ring is 152 mm. The angle of inclination β of the conical surface of the inner ring is 8 degrees. There are twenty bolts having a pre-tightening moment of 470 N·m. It is known that the spindle has a maximum transferable torque of 341 kN·m, a maximum bending moment of 168 kN·m and a maximum radial force of 526 kN. The spindle has a yield strength of 600 MPa, the bushing has a yield strength of 380 MPa, and both the inner ring and the outer ring have a yield strength of 800 MPa.

With the method of the present invention, the check process mainly comprises the following steps:

1) An axial force generated by bolts is calculated.

By the equations (1) and (2), the axial force generated by the bolts is calculated $F_a$=3916.667 kN, and the contact pressure between the inner ring and the outer ring is calculated $p_3$=210.641 MPa.

2) When the spindle and the bushing as well as the bushing and the inner ring are in a maximum fit clearance, a minimum contact pressure $p_{1a}$ between the spindle and the bushing is calculated $p_{1a}$=188.790 MPa, and also a minimum contact pressure $p_{2a}$ between the bushing and the inner ring is calculated $p_{2a}$=197.169 MPa. The transferred torque is $M_t$=405.850 kN·m.

3) According to a maximum torque and a maximum bending moment, and by the equations (5) and (6), an equivalent torque is calculated $M_{tT}$=351.194 kN·m; and the equivalent torque is compared with the transferred torque $M_t$ to calculate a torque safety coefficient $S_0$=1.16. It conforms to the design requirements.

4) According to the maximum bending moment and a maximum radial force, and by the equation (7), an edge stress is calculated q=127.663 MPa, where q is less than $p_{1a}$. It conforms to the design requirements.

5) when the spindle and the bushing as well as the bushing and the inner ring are in a minimum fit clearance, by the equations (2) and (3), a maximum contact pressure between the spindle and the bushing is calculated $p_{1b}$=197.877 MPa and also a maximum contact pressure between the bushing and the inner ring is calculated $P_{2b}$=205.626 MPa, and the strength of the spindle, the bushing, the inner ring and the outer ring is checked.

① The strength of the spindle is checked. A maximum normal stress $\sigma_1$, a shear stress $\tau_1$ and a bending stress $\sigma_{1b}$ of the spindle are calculated: $\sigma_1$=401.778 MPa, $\tau_1$=140.584 MPa and $\sigma_{1b}$=116.388 MPa. A maximum equivalent stress is calculated by the equation (8): $\sigma_{1s}$=586.19 MPa. The maximum equivalent stress is compared with a yield strength 600 MPa of the material of the spindle. A safety coefficient of the spindle is calculated by the equation (9): $S_1$=1.02. It conforms to the design requirements.

② The strength of the bushing is checked. A radial normal stress $\sigma_{2p}$, a circumferential normal stress $94_{2\varphi}$, a shear stress $\tau_2$ and a bending stress $\sigma_{2b}$ of the bushing are calculated: $\sigma_{2p}$=−197.877 MPa, $\sigma_{2\varphi}$=244.412 MPa, $\tau_2$=76.562 MPa and $\sigma_{2b}$=63.385 MPa. A resultant stress is obtained by the equation (10): $\sigma_{2s}$=324.37 MPa. The resultant stress is compared with a yield strength 380 MPa of the material of the bushing. A safety coefficient of the bushing is calculated by the equation (11): $S_2$=1.17. It conforms to the design requirements.

③ The strength of the inner ring is checked. A radial normal stress $\sigma_{3p}$ and a circumferential normal stress $\sigma_{3\varphi}$ of the inner ring are calculated: $\sigma_{3p}$=−205.626 MPa and $\sigma_{3\varphi}$=264.789 MPa. A resultant stress is obtained by the equation (12): $\sigma_{3s}$=240.72 MPa. The resultant stress is compared with a yield strength 800 MPa of the material of the inner ring. A safety coefficient of the inner ring is calculated by the equation (13): $S_3$=3.32. It conforms to the design requirements.

④ The strength of the outer ring is checked. A radial normal stress $\sigma_{4p}$ and a circumferential normal stress $\sigma_{4\varphi}$ of the outer ring are calculated: $\sigma_{4p}$=−210.641 MPa and $\sigma_{4\varphi}$=570.543 MPa. A resultant stress is obtained by the equation (14): $\sigma_{4s}$=700.05 MPa. The resultant stress is compared with a yield strength 800 MPa of the material of the outer ring. A safety coefficient of the outer ring is calculated by the equation (15): $S_4$=1.14. It conforms to the design requirements.

6) A pre-tightening force of a single bolt is calculated according to the given pre-tightening moment of the bolts.

The pre-tightening force of a single bolt Fal is calculated by the equation (16): $F_{a1}$=195.833 kN. The strength of the bolts is checked. A maximum equivalent stress is calculated by the equation (17): $\sigma$=81.04 MPa. The maximum equivalent stress is compared with an allowable stress 150 MPa of the bolts. A safety coefficient of the bolts is calculated by the equation (18): $S_5$=1.85. It conforms to the design requirements.

What is claimed is:

1. A method for manufacturing locking assemblies, the locking assemblies consisting of an inner ring, an outer ring and bolts and being sheathed on a bushing and a spindle, the method comprising:

checking the design of the locking assemblies, comprising steps of:

1) calculating an axial force generated by bolts:

calculating, according to the number n of selected bolts and a pre-tightening moment $M_0$, an axial force generated by bolts:

$$F_a = \frac{M_0 n}{kd} \quad (1)$$

where, $F_a$ is an axial force generated by the bolts, d is a diameter of the bolts, $M_0$ is a pre-tightening moment of the bolts, and k is a moment coefficient, the value of which is 0.11 to 0.15;

determining, according to a size of the locking assemblies and by force analysis, a contact pressure $p_3$ between the inner ring and the outer ring:

$$p_3 = \frac{F_a(1 - \mu_1 \tan\beta)}{L\pi d_3(\tan\beta + \mu_1)} \quad (2)$$

where, L is a length of the outer ring, $d_3$ is a mean diameter of a conical surface of the inner ring coming into contact with the outer ring, $\mu_1$ is a friction coefficient between the inner ring and the outer ring, and $\beta$ is an angle of inclination of the conical surface of the inner ring;

2) when the spindle and the bushing as well as the bushing and the inner ring are in a maximum fit clearance, calculating a minimum contact pressure $p_{1a}$ between the spindle and the bushing and also a minimum contact pressure $p_{2a}$ between the bushing and the inner ring, which are expressed by:

$$\begin{cases} (A - B)p_{1a} + Cp_{2a} = \Delta_{1max} \\ Dp_{1a} - (F + G)p_{2a} + Hp_3 = \Delta_{2max} \end{cases} \quad (3)$$

where, $\Delta_{1max}$ and $\Delta_{2max}$ are maximum fit clearances between the spindle and the bushing as well as between the bushing and the inner ring, $$A = -\frac{[1 + v_1 + (1 - v_1)(n_1)^2] \cdot d_1}{E_1[(n_1)^2 - 1]},$$

$$B = \frac{[1 - v_2 + (1 + v_2)(n_2)^2] \cdot d_1}{E_2[(n_2)^2 - 1]},$$

$$C = \frac{2d_1(n_2)^2}{E_2[(n_2)^2 - 1]},$$

$$D = \frac{2d_2}{E_2[(n_2)^2 - 1]},$$

$$F = \frac{[1 + v_2 + (1 - v_2)(n_2)^2] \cdot d_2}{E_2[(n_2)^2 - 1]},$$

$$G = \frac{[1 - v_3 + (1 + v_3)(n_3)^2] \cdot d_2}{E_3[(n_3)^2 - 1]},$$

$$H = \frac{2d_2(n_3)^2}{E_3[(n_3)^2 - 1]},$$

$$n_1 = \frac{d_1}{d_0},$$

$$n_2 = \frac{d_2}{d_1},$$

$$n_3 = \frac{d_3}{d_2},$$

$d_0$ is an inner diameter of the spindle, $d_1$ is an outer diameter of the spindle, $d_2$ is an outer diameter of the bushing, $d_3$ is a mean diameter of a conical surface of the inner ring coming into contact with the outer ring, $E_1$, $E_2$, $E_3$ are respectively elasticity moduli of the spindle, the bushing and the inner ring, $v_1$, $v_2$, $v_3$ are respectively Poisson's ratios of the spindle, the bushing and the inner ring;

calculating a transferred torque $M_t$ by the minimum contact pressure $p_{1a}$ between the spindle and the bushing:

$$M_t = \frac{p_{1a} \pi d_1^2 L_1 \mu}{2} \quad (4)$$

where, $L_1$ is a contact length between the bushing and the inner ring, and, $\mu$ is a friction coefficient between the spindle and the bushing;

3) calculating, according to a maximum torque $M_{max}$ and a maximum bending moment $M_b$ required in the design of the locking assemblies, an equivalent torque:

$$M_{tT} = \sqrt{M_{max}^2 + (KM_b)^2} \quad (5)$$

where, K is a conversion coefficient for the bending moment and the torque, the value of which is 0.3 to 0.6;

comparing the equivalent torque with the torque $M_t$ obtained in the equation (4) to calculate a torque safety coefficient:

$$S_0 = \frac{M_t}{M_{tT}} \quad (6)$$

4) calculating an edge stress according to the maximum bending moment $M_b$ and a maximum radial force $F_r$:

$$q = \frac{F_r}{S} + \frac{M_b}{W_z} \quad (7)$$

where, S is a cross-sectional area of the spindle, and $W_z$ is a section modulus in bending, the value of which can be found in the Machinery's Handbook; the obtained edge stress q is compared with $p_{1a}$ obtained in the equation (3), and it is considered as conforming to the design requirements if $q<P_{1a}$;

5) when the spindle and the bushing as well as the bushing and the inner ring are in a minimum fit clearance, by using $\Delta_{1min}$ and $\Delta_{2min}$ as minimum fit clearances between the spindle and the bushing as well as between the bushing and the inner ring, calculating a maximum contact pressure $p_{1b}$ between the spindle and the bushing and also a maximum contact pressure $p_{2b}$ between the bushing and the inner ring by the equations (2) and (3), and checking the strength of the spindle, the bushing, the inner ring and the outer ring;

6) calculating a pre-tightening force of a single bolt according to the given $$F_{a1} = \frac{M_0}{kd} \quad (16)$$

pre-tightening moment of the bolts:
where, $F_{a1}$ is the pre-tightening force of a single bolt; checking the strength of the bolts and calculating a maximum equivalent stress:

$$\sigma = \frac{5.2F_{a1}}{\pi d^2} \quad (17)$$

calculating a safety coefficient of the bolts:

$$S_5 = \frac{[\sigma]}{\sigma} \quad (18)$$

where, $[\sigma]$ is an allowable stress of the bolts, which can be obtained by searching from the Machinery's Handbook according to the level of performance of the bolts; and manufacturing the locking assemblies based on checked design of the locking assemblies.

2. The method of claim 1, wherein, in the step 5), the step of checking the strength of the spindle, the bushing, the inner ring and the outer ring comprises:

① checking the strength of the spindle: at an external pressure of $p_{1b}$ and an internal pressure of 0, calculating a maximum normal stress $\sigma_1$, a shear stress $\tau_1$, and a bending stress $\sigma_{1b}$, of the spindle, and calculating a maximum equivalent stress:

$$\sigma_{1s} = \sqrt{\sigma_1^2 + 3\tau_1^2} \pm \sigma_{1b} \quad (8)$$

comparing the maximum equivalent stress with a yield strength $\sigma_{1a}$, of the material of the spindle, and calculating a safety coefficient of the spindle:

$$S_1 = \sigma_{1a}/\sigma_{1s} \quad (9)$$

② checking the strength of the bushing: at an external pressure of $p_{2b}$ and an internal pressure of 0, calculating a radial normal stress $\sigma_{2p}$, a circumferential normal stress $\sigma_{2\varphi}$, a shear stress $\tau_2$ and a bending stress $\sigma_{2b}$ of the bushing, and calculating a maximum equivalent stress:

$$\sigma_{2s} = \sqrt{\sigma_{2p}^2 + \sigma_{2\varphi}^2 - \sigma_{2p}\sigma_{2\varphi} 3\tau_2^2} \pm \sigma_{2b} \quad (10)$$

comparing the maximum equivalent stress with a yield strength $\sigma_{2a}$ of the material of the bushing, and calculating a safety coefficient of the bushing:

$$S_2 = \sigma_{2a}/\sigma_{2s} \quad (11)$$

③ checking the strength of the inner ring: at an external pressure of $p_3$ and an internal pressure of $p_{2b}$, calculating a radial normal stress $\sigma_{3p}$, and a circumferential normal stress $\sigma_{3\varphi}$, of the inner ring, and calculating a maximum equivalent stress:

$$\sigma_{3s} = \sqrt{\sigma_{3p}^2 + \sigma_{3\varphi}^2 - \sigma_{3p}\sigma_{3\varphi}} \quad (12)$$

comparing the maximum equivalent stress with a yield strength $\sigma_{3a}$ of the material of the inner ring, and calculating a safety coefficient of the inner ring:

$$S_3 = \sigma_{3a}/\sigma_{3s} \quad (13)$$

④ checking the strength of the outer ring: at an external pressure of 0 and an internal pressure of $p_3$, calculating a radial normal stress $\sigma_{4p}$, and a circumferential normal stress $\sigma_{4\varphi}$, of the outer ring, and calculating a maximum equivalent stress:

$$\sigma_{4s} = \sqrt{\sigma_{4p}^2 + \sigma_{4\varphi}^2 - \sigma_{4p}\sigma_{4\varphi}} \quad (14)$$

comparing the maximum equivalent stress with a yield strength $\sigma_{4a}$ of the material of the outer ring, and calculating a safety coefficient of the outer ring:

$$S_4 = \sigma_{4a}/\sigma_{4s} \quad (15)$$

it is considered that it conforms to the design and check requirements if the safety coefficients $S_0$-$S_5$ are greater than 1.

* * * * *